United States Patent [19]
Sonobe

[11] Patent Number: 5,740,377
[45] Date of Patent: Apr. 14, 1998

[54] ELECTRONIC DEVICE FOR COMPUTER

[75] Inventor: Yoshiiku Sonobe, Nagoya, Japan

[73] Assignee: Melco, Inc., Aichi-ken, Japan

[21] Appl. No.: 609,165

[22] Filed: Mar. 1, 1996

[30] Foreign Application Priority Data

Mar. 7, 1995 [JP] Japan .................... 7-077200

[51] Int. Cl.⁶ .................. G06F 13/00; G06F 12/00
[52] U.S. Cl. ........................... 395/282; 395/402
[58] Field of Search ..................... 395/282, 500, 395/402, 404, 405

[56] References Cited

U.S. PATENT DOCUMENTS

| | | | |
|---|---|---|---|
| 4,545,010 | 10/1985 | Salas et al. | 395/405 |
| 4,969,086 | 11/1990 | Pfeiffer et al. | 395/200.3 |
| 5,079,737 | 1/1992 | Hackbarth | 395/404 |
| 5,297,272 | 3/1994 | Lu et al. | 395/500 |
| 5,410,726 | 4/1995 | Baqui et al. | 395/800 |
| 5,455,927 | 10/1995 | Huang | 395/500 |
| 5,493,655 | 2/1996 | Shen et al. | 395/280 |
| 5,513,329 | 4/1996 | Pecone | 395/281 |
| 5,546,563 | 8/1996 | Chuang | 395/500 |
| 5,586,270 | 12/1996 | Rotier et al. | 395/282 |
| 5,586,304 | 12/1996 | Stupek, Jr. et al. | 395/712 |
| 5,588,143 | 12/1996 | Stupek, Jr. et al. | 395/500 |
| 5,623,618 | 4/1997 | Brewer et al. | 395/402 |

OTHER PUBLICATIONS

Electronic Design, vol. 39, No. 1, 10 Jan. 1991, pp. 130–133, 136–138, 140, XP000207766: Rozenshein Z: "Boost PC's Floating-Point Speed With An Add-On DSP Coprocessor Board".

Hewlett–Packard Journal, vol. 43, No. 2, 1 Apr. 1992, pp. 110–116, XP000356392 Moore MP et al: "A High–Performance Measurement Coprocessor For Personal Computers".

Primary Examiner—Ayaz R. Sheikh
Attorney, Agent, or Firm—Beyer & Weaver, LLP

[57] ABSTRACT

The electronic computer device according to the present invention comprises an alternative CPU 22 which operates in place of a low-speed CPU on the mother board when it is connected to such as a connector on the mother board of a computer. The electronic computer device 20 is provided with an address bus on its PCB 24, of which bus width is larger than that of the address bus on the mother board 50, and the dual in-line memory modules inserted in the expansion slots 40 connected to the such address bus provides an address space larger than 16 Mbytes. The alternative CPU 22 which can utilize this large address space can perform processing beyond the limitation of the bus width of the address bus on the side of the mother board 50. The DMA transfer to an address area which is not supported by the DMA controller on the side of the mother board 50 can be realized simply by performing the DMA transfer once to the address area of lower significance.

15 Claims, 8 Drawing Sheets

ELECTRONIC DEVICE FOR COMPUTER

BACKGROUND OF THE INVENTION

1. Field of the Invention

The present invention relates to an electronic computer device which activates an alternative CPU in place of a packaged CPU on a mother board of a personal computer and controls the personal computer by the alternative CPU.

2. Description of the Related Art

Software functions being operated on a computer and the operating speed are usually in a trade-off relation, so that the execution of complicated processing results with decrease in the processing speed. When the software functions are increased by up-versioning of an operating system (hereinafter referred to as OS) or application software, the increased load on a CPU originally mounted on the mother board of the personal computer becomes a cause of decrease in the processing speed. In order to cope with software expanding year after year, semiconductor manufacturers develop CPUs operating at higher speeds and the computer manufacturers sell the personal computers mounted with the higher-performance CPUs as new products.

Along with increase in the functions and speed of the new products, electronic devices, such as accelerators which afford higher performance to existing personal computers, have been proposed. They activate an alternative CPU in place of a packaged CPU on the mother board. Various accelerators have been developed and sold, ranging from the one which simply substitutes for the packaged CPU with a high-performance CPU to the one which incorporates such as a high-speed clock generating circuit based on the mother-board-side clock or a control circuit exclusively for timing with the mother board side.

Utilization of these electronic computer devices enables both increase in the functions and speed of the CPU which controls the personal computer and continual use of the peripherals, such as a packaged hard disk, as well as the main memory DRAM on the mother board and the image display VRAM. Therefore, the processing performance of the personal computer is up-graded economically and thus information processing operations can be carried out efficiently since high-level-function software which will result with excessive load is available.

The above-described conventional electronic computer devices, however, have left the following issues unsolved. Since the program itself of up-versioned high-level-function software has been expanded, its main memory also require simultaneous expansion in order to be processed by the CPU. Although a mother board of some personal computers is already equipped with a memory expansion slot for expansion of the memory, memory expansion with the memory expansion slot is limited. Moreover, since the limitation of the memory expansion has been decided by the systems design which consider the packaged CPU processing capacity, it is sometimes found insufficient for the main memory for the alternative CPU to be mounted on the electronic computer device.

Some computers are provided with a virtual memory function which utilizes an empty area of the hard disk as a part of the main memory and the main memory area is thus expanded by such virtual memory. Many personal computers are provided with an expansion slot connected to a low-speed bus for mounting of any of the various expansion boards, where a memory board which is mounted with memory chips and inserted in the expansion slot can be used as the main memory. However, when the main memory is expanded through such utilization of the virtual memory function and insertion of the memory board into the expansion slot, operation of software requiring a large capacity of memory is available but benefit of the alternative CPU which is capable of high-speed operation is not available due to decrease in the memory access speed. This results from extremely low access speed of the hard disk and the memory board connected to the expansion slot.

A purpose of the electronic computer device according to the present invention is to resolve such issues as above through enhancement of a total processing performance of the personal computers and the high-speed processing of high-level-function software which requires a large memory area and a complicated processing.

SUMMARY OF THE INVENTION

The main purpose of the present invention is to maximally exercise the function of a high-speed CPU which substitutes for the CPU on the mother board of the computer without limitations by memory package conditions. For attainment of this purpose, an electronic computer device according to the invention comprises:

an alternative CPU in place of a packaged CPU on a mother board of a computer, wherein said alternative CPU controls said computer:

a sub-connector equipped on said electronic computer device for connecting to a main connector provided on said mother board of said computer, which said sub-connector connects an address and data bus of said alternative CPU to that of said packaged CPU;

an expansion memory bus which is connected from a terminal for memory control of said alternative CPU and which has a bus width wider than a bus width of said address bus of said personal computer;

a memory means allocated in a memory address area expanded by said expansion memory bus; and a memory control means connected to said expansion memory bus and to a control signal line for memory control, said memory control means makes said alternative CPU access said memory means when a memory address specified by said alternative CPU is in said expanded memory address area.

In this electronic computer device, the alternative CPU which is connected to the main memory of the computer and the peripherals via connectors control the personal computer. The memory means which is connected to the expansion memory bus extended from the memory control terminal of the alternative CPU accesses the predetermined address of the memory means which is connected to the expansion memory bus when the memory address pointed by the alternative CPU is in the expanded memory address area.

DESCRIPTION OF THE PREFERRED EMBODIMENTS

Figure 1:
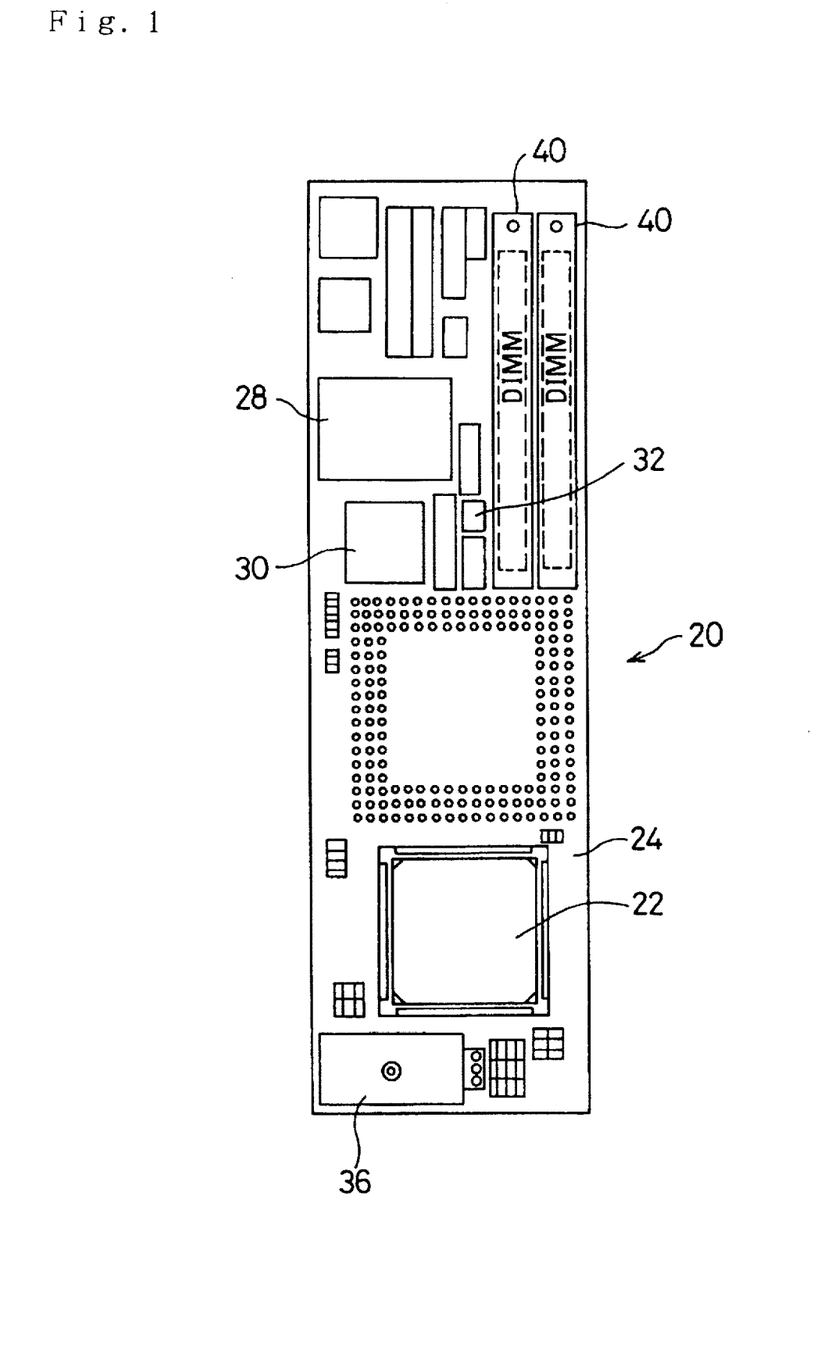
FIG. 1 is a plan showing the components side of the electronic computer device 20 as an embodiment of the present invention.
Figure 2:
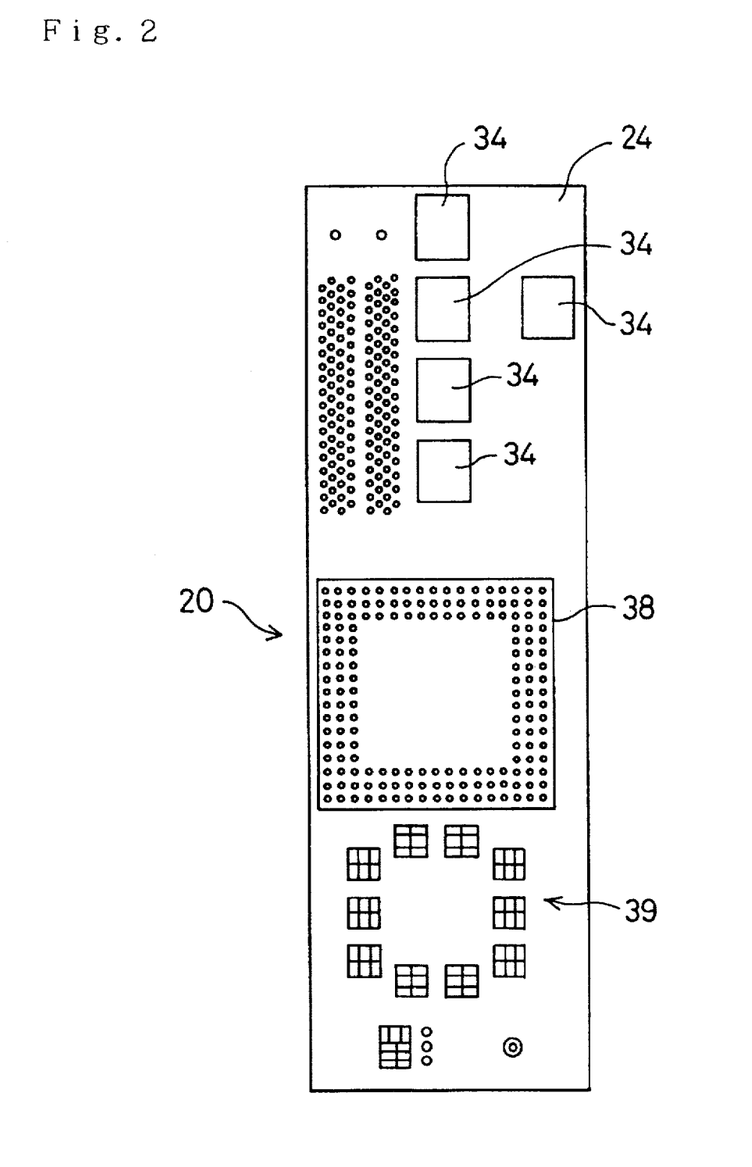
FIG. 2 is a rear surface plan showing the solder side of the electronic computer device 20.

For further elucidation of the constitution and effect of the present invention described above, a preferred embodiment of the electronic computer device is described below. FIGS. 1 and 2 are the drawings showing the components side (top plan) and the solder surface (rear-surface plan) of an electronic computer device 20 as the embodiment. On the electronic computer device 20, an Intel i486DX4 (a registered trade name of Intel) is mounted as a high-performance alternative CPU 22. This electronic computer device 20 is basically designed, as described below, so as to operate in place of a packaged CPU on a mother board 50 when attached to an ODP (over drive processor) socket 52 on the mother board 50 of a personal computer. Therefore, a large number of components are efficiently packaged on an extremely small PCB (Printed Circuit Board) 24 so as to eliminate contact with other packaged components at the time of mounting it on the mother board.

Peripheral circuits, such as a memory control IC 28, a PLD 30, a clock driver 32 and a power supply IC 36, are arranged on the top of the PCB 24, as in FIG. 1. Bus drivers 34, a connector 38 for attachment to the mother board 50, more than one bypass capacitor group 39 for reduction in impedance of power supply line leading to the alternative CPU 22 and the other components are provided on the rear side, as in FIG. 2. Due to drawing limitations, other bypass capacitors and resistors packaged on the surface as a surface-package-type packaging are eliminated in FIGS. 1 and 2.

Two expansion slots 40 for DIMMs (dual in-line memory modules) are connected to the memory bus of the alternative CPU 22, where two 1-, 4-, 8- 16- or 32-Mbyte DIMMs of may be mounted. If supply voltage of the alternative CPU 22 of the electronic computer device 20 is different from supply voltage of the mother board 50 (5V) or, if an energy-saving CPU which operates at 3.3V is adopted, the power supply IC 36 supplies 3.3V stable supply voltage power for the electronic computer device 20 from the power source in the mother board 50. If the energy-saving CPU is adopted, this power supply IC 36 is attached to the PCB 24.

Figure 3:
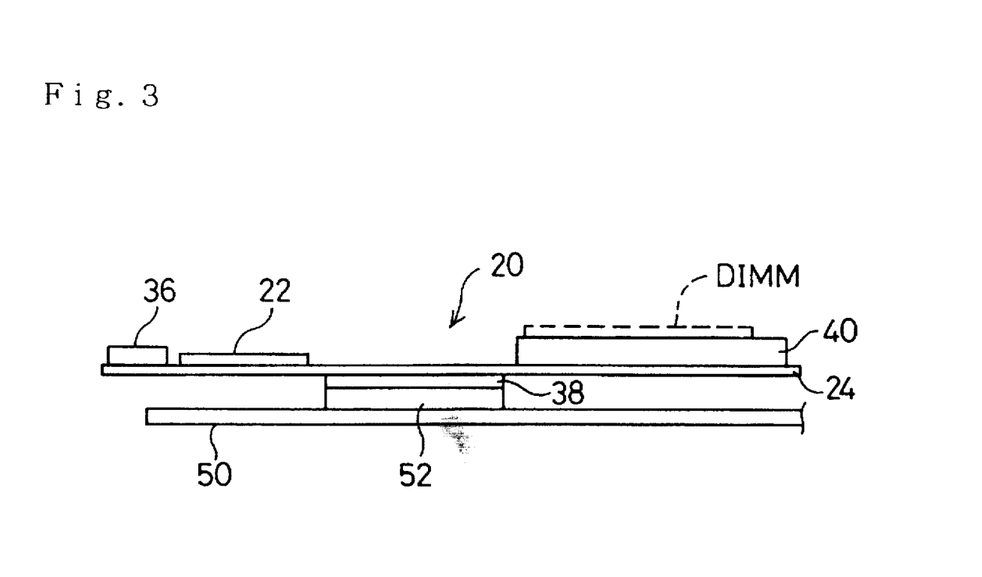
FIG. 3 is a side view showing the state where the electronic computer device 20 is mounted on the mother board 50.

FIG. 3 is a side view showing the state where the electronic computer device 20 is attached to an ODP socket 52 on the mother board 50 by the connector 38. In general, a system which adopts an Intel CPU, i486DX, i486DX2 or i486SX, as a packaged CPU is provided with the socket 52 for mounting of an ODP on the mother board 50. A computer which is provided with the ODP socket 52 has a constitution where the alternative CPU starts operation in place of the packaged CPU while the packaged CPU is inactive without removing the packaged CPU from the mother board if the alternative CPU 22 is attached to the socket 52. FIG. 3 shows an example of the constitution where the alternative CPU for the electronic computer device 20 is directly inserted into the ODP socket 52 but this is only an example and a variety of other constitutions are available; such as a constitution where it is directly inserted into the socket for the packaged CPU after removal of the packaged CPU on the mother board 50 and a constitution where a socket for a co-processor on the mother board 50 is utilized.

Figure 4:
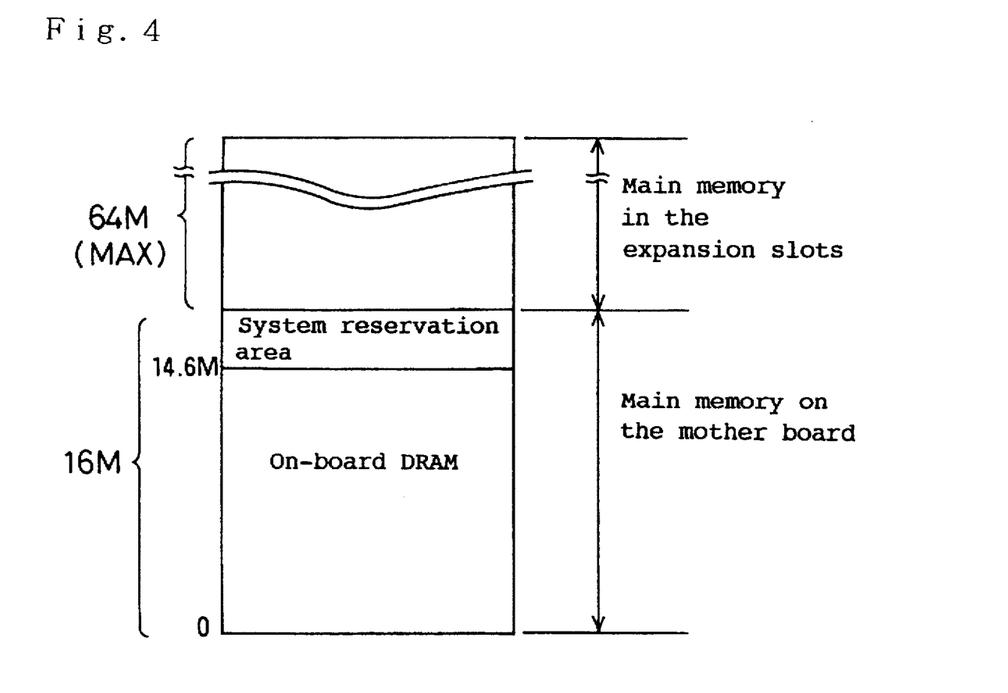
FIG. 4 shows a memory map of the electronic computer device 20 as an embodiment.

As in FIG. 4, since the address width of the memory bus of the packaged CPU provided on the mother board 50 is 24 bits, a maximum of 16 Mbyte range can be addressed as main memory. Additionally, the higher-order memory area in this range is a system reservation area which is used by the system, such as BIOS stored in a ROM or other device on the mother board 50, which is not shown in the figure, and thus only 14.6 Mbyte range is available for application software and so on.

Figure 5:
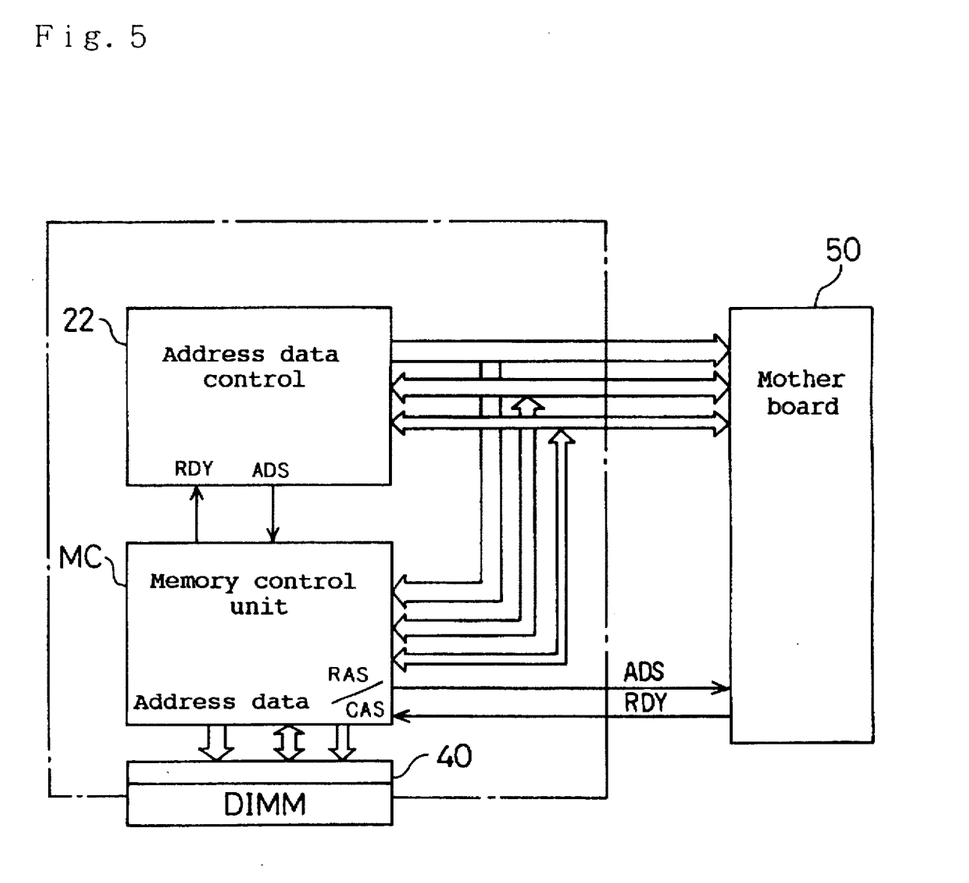
FIG. 5 is a schematic drawing showing the electric connections between the electronic computer device 20 and the mother board 50.
Figure 6:
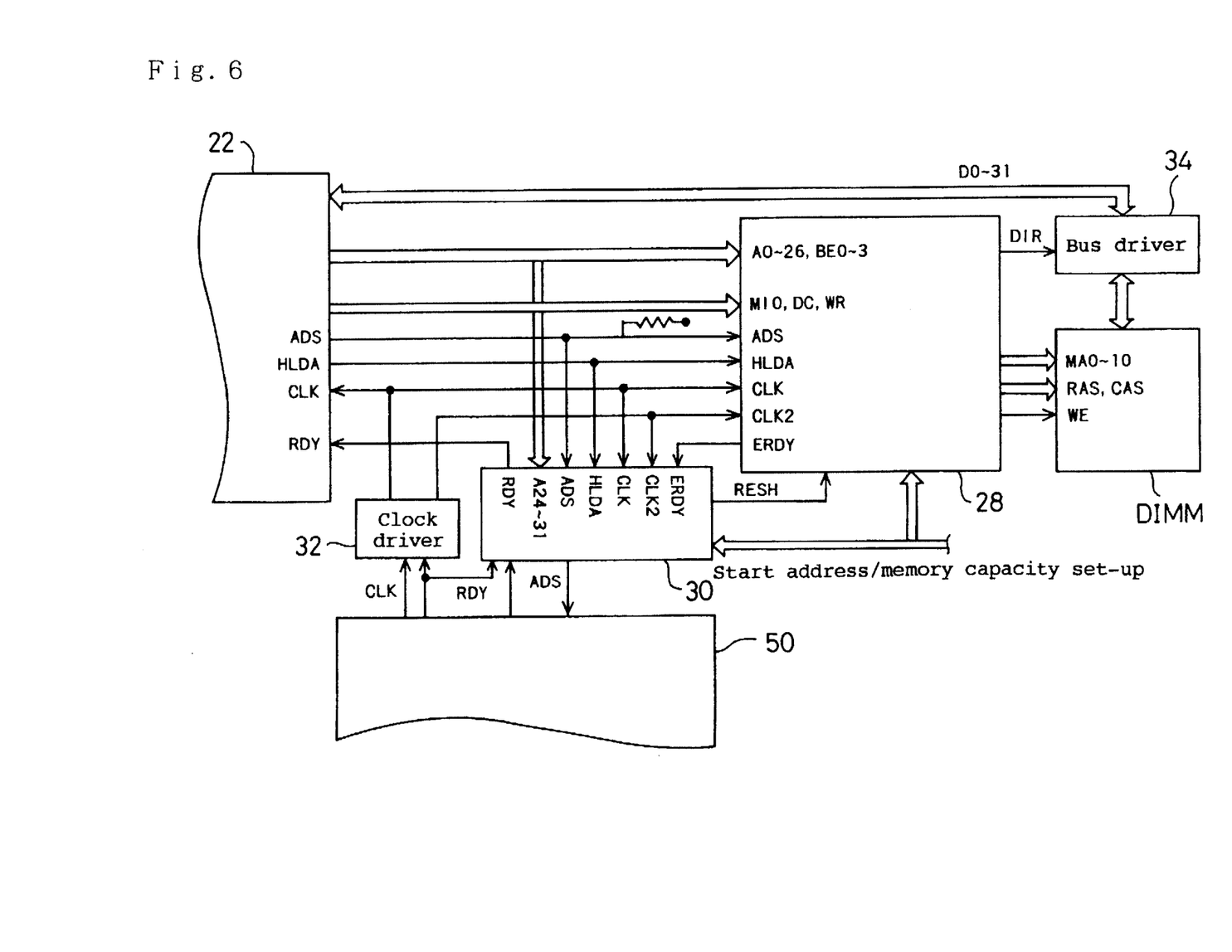
FIG. 6 is a block diagram showing an internal configuration of the memory control component MC of the electronic computer device 20.

In this embodiment, the electronic computer device 20 is connected to the address bus on the mother board 50 on attachment to the ODP socket 52. The connections are outlined in FIG. 5. As in FIG. 5, the electronic computer device 20 as an embodiment roughly consists of the alternative CPU 22 which is capable of high-speed operation, the expansion memory which is provided in the DIMM type and the memory control component MC which performs memory control; and the alternative CPU 22 and the memory control component MC are connected to the address bus, the data bus and other control bus from the mother board 50 via the ODP socket 52. FIG. 6 shows a detailed constitution of the memory control component MC to elucidate the connections between the mother board 50 and the alternative CPU 22 as well as the expansion memory. As in FIG. 6, the memory control component MC consists of the memory IC 28, the PLD 30, the clock driver 32 and the bus driver 34. The memory control component MC performs control when the alternative CPU 22 accesses the DIMM inserted in the expansion slot 40 on the electronic computer device 20.

Every bus (address bus, data bus, control bus, and so on) is under the control of the alternative CPU 22 which is connected to the ODP socket 52 on the mother board 50. The address bus of the alternative CPU 22 is provided with the width of A0 through A26 which is a sufficient address space for 16 Mbytes on the mother board and 64 Mbytes of the two 32-Mbyte DIMMs inserted in the expansion slots 40.

The memory control component MC which is connected to every bus in the same way as the alternative CPU 22 and naturally connects the DIMMs inserted in the expansion slots 40 and each signal line and controls the address strobe signal (herein after referred to as ADS) which is output to the mother board 50 and the ready signal (hereinafter referred to as RDY) which is output from the mother board 50. When the alternative CPU 22 outputs an address, the address bus signals of the lower order A0 through A23 are also supplied to the memory on the side of the mother board 50, so that, if the alternative CPU 22 has addressed a DIMM in the expansion slot, which is over the 16-Mbyte area, the ADS output to the mother board is forbidden by the PLD 30. The PLD 30 also performs arbitration between the RDY signal from the mother board 50 and the RDY signal from the expansion memory on the electronic computer device 20, or simply performs logical OR operation. Additionally, the PLD 30 outputs the refresh signal (RFSH) to the memory control IC 28 while the hold acknowledge signal (HLDA) is being output from the alternative CPU 22 so as to control the timing of refreshing the DRAM in the expansion slot 40.

The clock signal (CLK) is multiplied by the PLD 30 and the clock driver 32 at the memory control component MC to generate new clock (CLK) signals which are 1.5-, 2- and 3-time multiplications of the CLK signal. Since all the synchronous elements on the side of the mother board operate in synchronism with the CLK, several kinds of rate-multiplied clocks are generated to operate the alternative CPU 22 on the electronic computer device 20 at the allowable maximum operating frequency while maintaining synchronism with those elements. When only the speed of the alternative CPU 22 is increased, the entire operating speed is not much improved if the peripheral elements operate only at low speeds. When the alternative CPU 22 and the clock for all the connected elements are optimized, a maximum operating speed of the electronic computer device 20 itself is attained. The rate-multipliers are set up by an external circuit, such as a jumper wire or a dip switch, which is not shown in the figure.

To explain the operations of the memory control component MC in Pig. 6, function of each signal is described below with reference to the internal block diagram (FIG. 7) of the memory control IC 28 which performs the main operations. The memory control IC 28 receives address signals and control signals from the alternative CPU 22 and generates control signals for various DRAMs used in the DIMMs. The DRAMs are varied such as in the access mode as well as in the capacity. The memory control IC 28 comprises "mode" 28A which is a block where the DRAM operation mode, the start address and so on are set up, "cs-status" 28B which is a decoder where the CPU bus cycle is monitored, "ma" 28C which is a block where the multiplexed address for the DRAM is output, "rasacc" 28D which is a block where the RAS access is controlled, "preras" 28E which is a block where the RAS is precharged, "casacc" 28F which is a block where CAS access is controlled, "ras" 28G which is a block where the RAS pulse is controlled, "cas" 28H which is a block where the CAS pulse is controlled, and "buffer" 28I which is a block where the data bus buffer is controlled.

Figure 7:
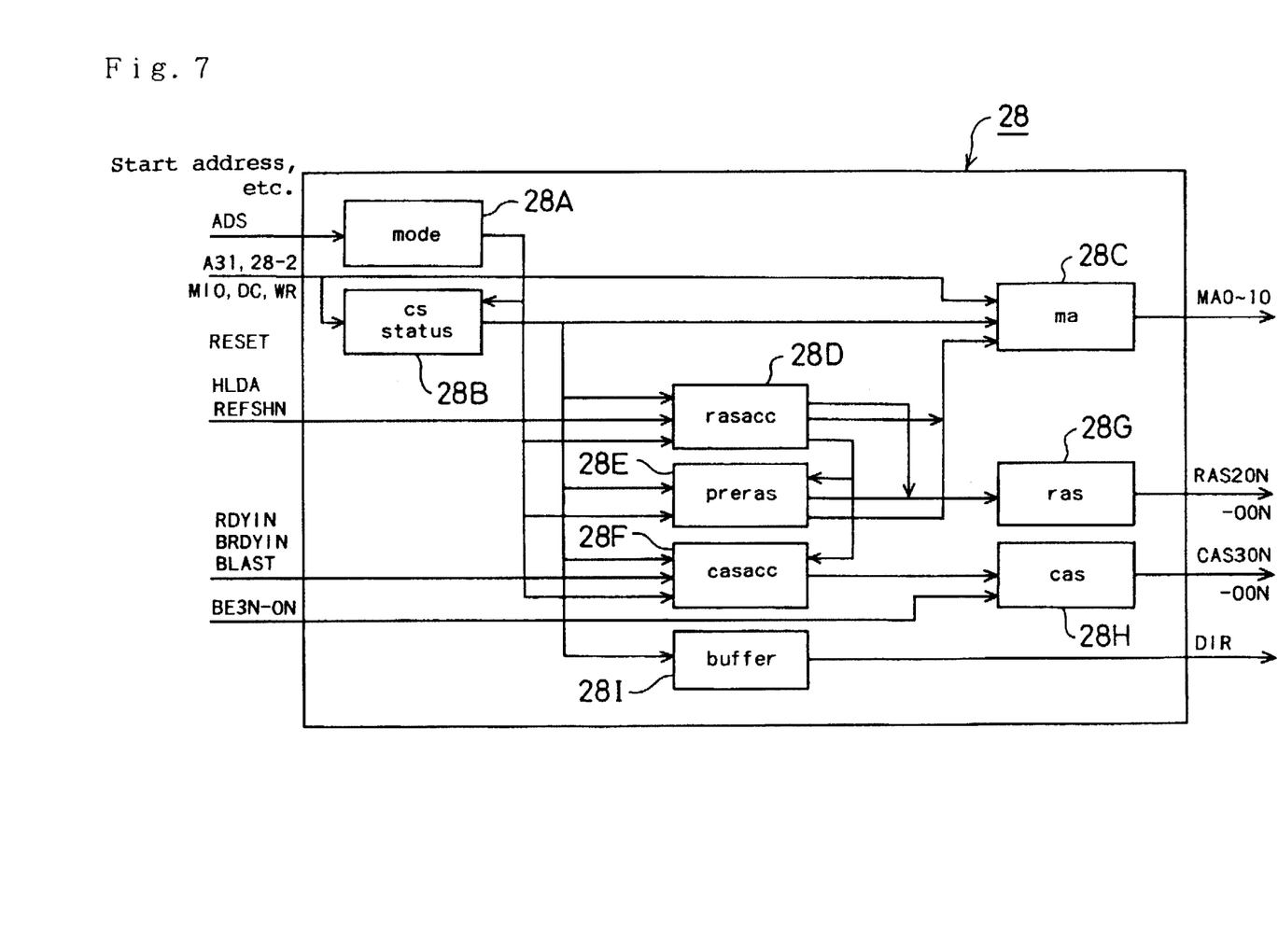
FIG. 7 is an illustrative drawing showing the internal configuration of the memory control IC which is a part of the memory control component MC, where the functions are respectively shown in each block.

"mode" 28A is a block where various modes are set up. Input of predetermined signals from external circuits to "mode" enables arbitrary setting up of such as whether a wait cycle is required for the memory access or not, whether the output width of the RDY is one clock or the output is held until a response from the outside is gained, the start address of the expansion memory (over 16 Mbytes in this embodiment, as in FIG. 4), and the expansion memory capacity and the access mode matching the DRAM in use.

"cs-status" 28B is in charge of monitoring and decoding of the CPU bus cycle, which executes the address decoding and the CPU cycle decoding of such as the IO cycle, the code access and the data access. "ma" 28C performs the multiplex processing of the RAS address and the CAS address and the RAS address generation processing under the control of "rasacc" 28D. "ma" 28C outputs multiplexed address signals MA0 through MA10. "rasacc" 28D performs the monitoring of whether the paging is continuous or not, and instruction of the RAS precharge start by the monitoring of completion of refreshing and by the monitoring of completion of DMA. "preras" 28E is the block which actually generates the RAS precharge cycle pulse which is synchronous with the memory access on receiving the controlling output from "rasacc" 28D. The controlling output of "rasacc" 28D is also input to "casacc" 28F where the CAS timing signal is generated in synchronism with the memory access. "Ras" 28G and "cas" 28H are the blocks where the RAS pulses 00N through 20N and the CAS pulses CAS 00N thorough 30N are generated respectively; selection from the two expansion slots 40 is performed by the RAS pulses and the access is performed by the CAS pulses in the data width (long word, word or byte) as instructed by "cs-status". As described above, the memory control IC 28 in this embodiment can accept a first-page-mode DRAM which performs a high-speed data access by varying the CAS signals only while maintaining the RAS signal as low-active.

"Buffer" 28I is the block which controls the directions of the input and output signals of the bus driver 34, which decides on the transfer direction of the data bus information, whether from the expansion slots 40 to the alternative CPU 22 or from the alternative CPU 22 to the expansion slots 40, and which controls the bus driver 34 with its output DIR.

The alternative CPU 22 of the electronic computer device 20 executes internal processing, such as arithmetic operation, at a high clock frequency appropriate to the alternative CPU 22. By the memory control component MC, while the memory elements packaged on the mother board 50 are utilized as for the main memory addresses in the 16-Mbyte memory area and the DIMMs inserted in the expansion slots 40 are utilized as the main memory to read and write data in the higher-order address area over the 16-Mbyte area. A high-speed clock frequency of the alternative CPU 22 enables access to the main memory larger than 16 Mbytes which is inserted in the expansion slots 40 and thus the capabilities of the alternative CPU 22 can be utilized maximally.

As described above in detail, the electronic computer device 20 of this embodiment can activate the high-performance alternative CPU 22 in place of the packaged CPU on the mother board simply by attaching it to the ODP socket 52 on the mother board 50. Moreover, even if the main memory area of the packaged CPU (16 Mbytes) is limited according to the system design of the mother board 50, the main memory area can be expanded to its higher-order area besides the utilization of the packaged main memory area as it is. That is, in the embodiment, if an address in the 16-Mbyte area is output to the address bus, the ADS is output to the address bus on the side of the mother board to access the memory on the mother board 50 while the DRAM in the DIMM is accessed by the output of the ADS exclusively to the address bus if an address in the higher-order area over the 16-Mbyte area is output. Additionally, a no-wait high-speed access to the main memory area over the 16-Mbyte area, which is inserted in the expansion slots 40, is realized by synchronism with the clock of the alternative CPU 22.

Figure 8:
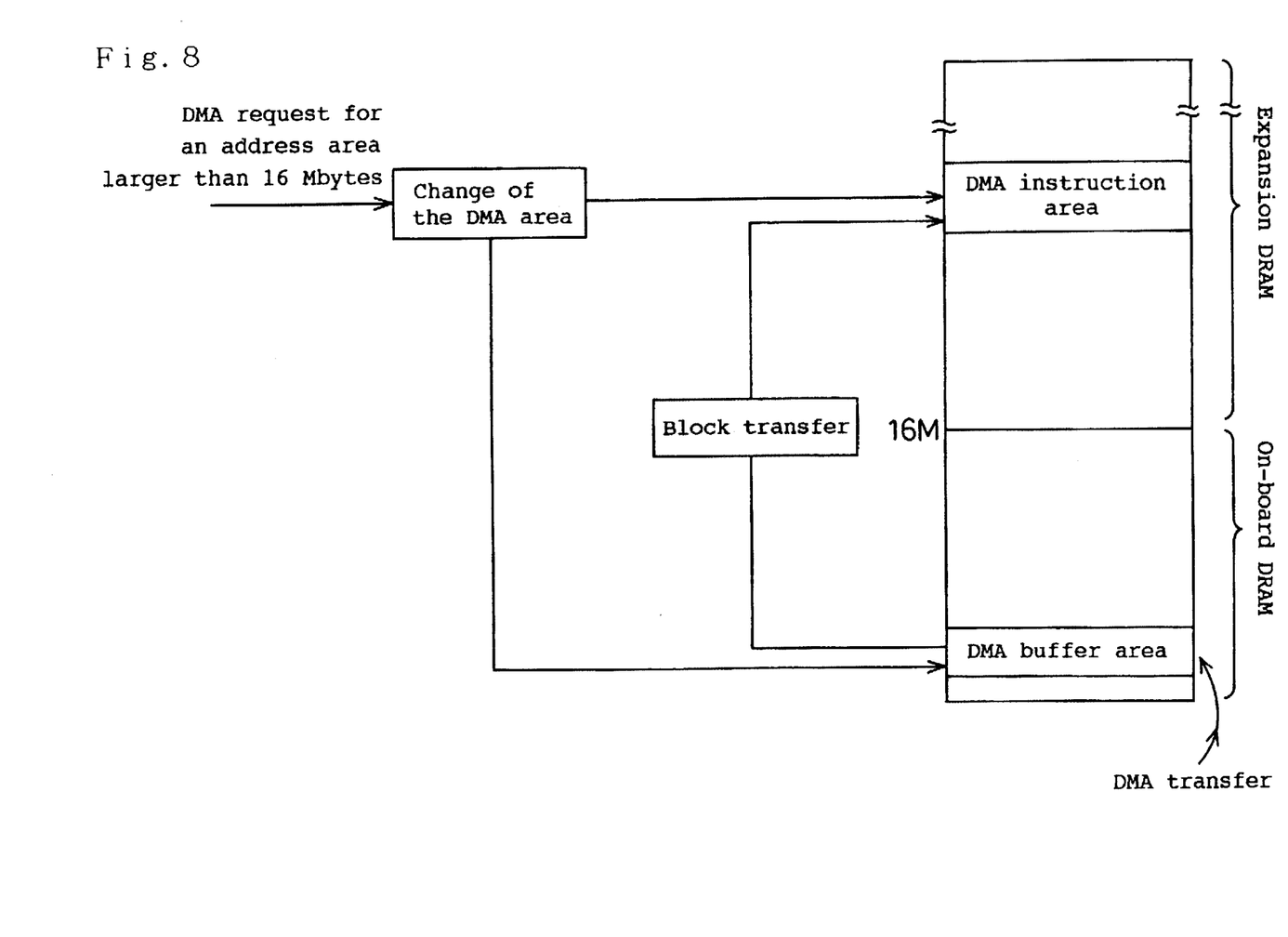
FIG. 8 is an illustrative drawing showing the processing at the time of request for DMA transfer to the expansion memory area of the electronic computer device 20.

When a DMA controller is provided on the mother board 50 to support DMA between the peripherals and the main memory, transfer to a higher-order address area over the 16-Mbyte area is not available for a computer where this is not assumed. The controller for DMA transfer is on the side of the mother board 50, and thus its address bus cannot specify any address in the higher-order address area over the 16-Mbyte area. The electronic computer device of this embodiment, however, can accept a DMA transfer request concerning any address in the higher-order area beyond the 16-Mbyte area by changing the DMA transfer driver. FIG. 8 shows the operation of the DMA driver after the change. As shown in FIG. 8, this embodiment deals the DMA transfer request for the expansion memory by substituting the DMA transfer area. That is, if the DMA transfer request specifies a higher-order address area over the 16-Mbyte area, while a DMA buffer area is secured in the packaged DRAM area on the mother board, the DMA transfer request is trapped and the target memory are of the DMA transfer is changed into the DMA buffer area. After execution of the DMA transfer, a block transfer of the contents written in the DMA buffer area to the higher-order area over the 16-Mbyte area, which is originally specified as the destination of the DMA transfer, is executed by a high-speed processing of the alternative CPU 22.

Figure 9:
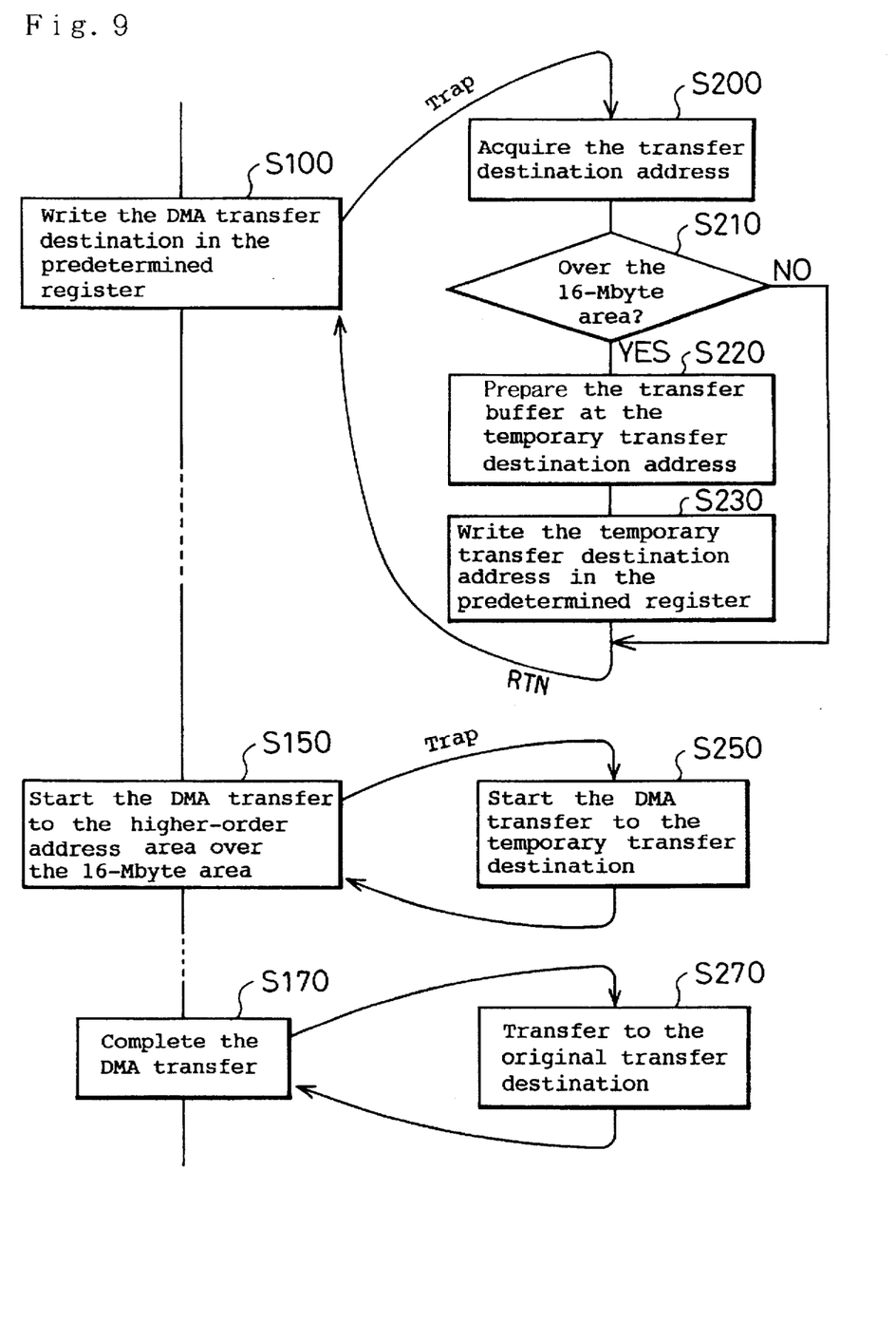
FIG. 9 is a flowchart showing the interrupt processing at the time of carrying out DMA transfer.

With utilization of the flowchart in FIG. 9, the processing is described in the following paragraphs. If a program executed by the alternative CPU 22 includes a step which requires the DMA transfer, the program always writes the address to be transferred to in the register for setting up of the address of the DMA transfer destination (Step 100). The ring protection level is set up so that an interrupt of exception to general protection is generated by the processing of writing in the register. Consequently, if the address of the DMA transfer destination is to be written in the predetermined register, trapping occurs and the processing shifts to the privileged level and the interrupt handling routine which has been prepared in advance (Step 200 and the following) is executed. Such interrupt processing of exception to the general protection is prepared by incorporating a device driver for DMA transfer into the OS.

In the interrupt processing, the destination address of the DMA transfer which has tried writing in the predetermined register is gained (Step 200). The address is judged whether in the higher-order area over the 16-Mbyte area (Step 210). If the DMA transfer destination address is in the higher-order area over the 16-Mbyte area, a temporary transfer destination address is set up in the predetermined area within the 16-Mbyte area and the area is secured as a buffer for the transfer (Step 220). As in FIG. 8, the DMA transfer buffer area is in the 16-Mbyte area. Such securing of the area is realized by a memory manager not shown in the figure. Next, the temporary transfer destination address secured in this way is written in the predetermined register where the original DMA transfer destination address is written (Step 230). Since the ring protection is set up at the highest order at the time of this processing, an interrupt of exception to general protection will not be generated. After completion of the processing steps described above, the ring protection level is returned to the original one and the interrupt handling routine is completed to return to the original processing sequence.

Next, according to the program which includes the DMA transfer, after setting up of the transfer destination address, the transfer origin address, the transfer byte numbers and other parameters are set up and then start of the DMA transfer is instructed (Step 150). Since this instruction is given in such a form as the writing of the start command in a predetermined register, the trap of exception to the general protection is generated again, and the DMA transfer to the temporary transfer destination address starts (Step 250). After completion of the DMA transfer, the processing sequence returns to the original routine and then the processing to specify completion of the DMA transfer is performed in such a form as writing of the stop command in the predetermined register (Step 170), which generates an exception to the general protection, and thus the block transfer of data in the temporary transfer area to the original DMA transfer destination address in the expansion memory area is executed by the alternative CPU 22 (Step 270). As the result, as in FIG. 8, data is finally transferred to the DMA specified area in the expansion memory area which is the original DMA transfer destination.

With utilization of the electronic computer device 20 which executes such controls as described above, in such a case as the DMA transfer to the expansion memory area over the 16-Mbyte area is executed since the application program assumes that the main memory larger than 16 Mbytes is available, the modification of an application program is not required for the computer which executes DMA transfer with the mounted DMA controller even if the transfer to the expansion memory area by the DMA controller is not available. Therefore, a total processing performance of the personal computer can be enhanced extremely economically and the high-level-function software which requires a large memory area and complicated processing can be processed at a high speed. As the result, the electronic computer device 20 can be utilized in a remarkably wide field.

The present invention is not limited to the embodiments described above but available in various modes within the scope of the invention.

What is claimed is:

1. A computer comprising:

a mother board having a first CPU mounted thereon;

an expansion board having a second CPU mounted thereon connected to said mother board, said expansion board being connected to said mother board such that an address and data bus of said second CPU is connected to an address and data bus of said first CPU, said expansion board further including:

an expansion memory bus which is connected to a terminal for memory control of said second CPU and which has a bus width wider than a bus width of said address bus of said first CPU;

a memory means allocated in an expanded memory address area expanded by said expansion memory bus; and a memory control means connected to said expansion memory bus and to a control signal line for memory control, said memory control means causing said second CPU to access said memory means when a memory address specified by said second CPU is in said expanded memory address area, wherein said second CPU controls said computer.

2. The computer of claim 1, wherein said memory means is comprised of detachable dual in-line memory modules.

3. The computer of claim 1, wherein said memory control means controls access to a predetermined address by controlling an address strobe signal.

4. The computer of claim 1, further comprising:

a buffer preparing means which prepares a temporary data storage area in a main memory located at a lower address than that of an expansion memory when a direct memory access instruction is inputted, said direct memory access instruction being an instruction to access said memory means which is allocated in said expanded memory address area expanded by said expansion memory bus;

a direct memory access change means for changing said instruction so as to perform a direct memory access to said temporary storage area prepared by said buffer preparing means; and a block transfer means which performs a block transfer of data stored in said temporary storage area to memory addresses according to said direct memory access instruction with use of said second CPU on completion of said direct memory access according to said instruction changed by said direct memory access instruction.

5. The computer of claim 4, wherein said buffer preparing means includes interrupt processing which is executed by trapping said direct memory access instruction to said memory means allocated in said expanded memory address area.

6. The computer of claim 1, wherein said first CPU is an Intel Class 486 processor.

7. An expansion circuit board for upgrading an original CPU which is mounted on a mother board of a personal computer and which is connected to an address bus having a first bus width, comprising:

an expansion CPU;

a connector for connecting said expansion board to said computer, said connector connecting said address bus of said original CPU to said expansion CPU;

at least one slot for receiving an expansion memory;

an expansion memory bus connected to a terminal for memory control of said expansion CPU and said at least one slot for receiving said expansion memory, said expansion memory bus including an address bus having a second bus width wider than said first bus width; and a memory control unit connected to said expansion memory bus and to a control signal line for memory control, said memory control unit causing said CPU to access said expansion memory when a memory address specified by said CPU is in said expansion memory.

8. The expansion circuit board of claim 7, wherein the board includes two slots for receiving expansion memory.

9. The expansion circuit board of claim 8, wherein dual in-line memory modules are detachably mounted in the two slots for receiving expansion memory.

10. The expansion circuit board of claim 7, wherein the memory control unit comprises a memory integrated circuit, a programmable logic device, a clock driver, and a bus driver.

11. The expansion circuit board of claim 8, wherein the memory control unit comprises a memory integrated circuit, a programmable logic device, a clock driver, and a bus driver.

12. The expansion circuit board of claim 7, further comprising a power supply integrated circuit.

13. The expansion circuit board of claim 12, wherein the power supply integrated circuit supplies power at about 3.3 volts.

14. The expansion circuit board of claim 11, further comprising a power supply integrated circuit.

15. The expansion circuit board of claim 14, wherein the power supply integrated circuit supplies power at about 3.3 volts.

* * * * *